United States Patent
Zohar et al.

(10) Patent No.: US 7,552,297 B2
(45) Date of Patent: Jun. 23, 2009

(54) INSTANT COPY OF DATA IN A CACHE MEMORY VIA AN ATOMIC COMMAND

(75) Inventors: Ofir Zohar, Alfe-Menashe (IL); Haim Helman, Herzelya (IL); Dror Cohen, Tel Aviv (IL); Shemer Schwartz, Tel Aviv (IL); Yaron Revah, Tel Aviv (IL); Efri Zeidner, Mozkin (IL)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 11/491,475

(22) Filed: Jul. 21, 2006

(65) Prior Publication Data

US 2007/0073987 A1 Mar. 29, 2007

Related U.S. Application Data

(60) Provisional application No. 60/721,546, filed on Sep. 29, 2005.

(51) Int. Cl.
*G06F 12/16* (2006.01)
(52) U.S. Cl. .......................... 711/162; 711/161
(58) Field of Classification Search ........................ None
See application file for complete search history.

(56) References Cited

U.S. PATENT DOCUMENTS

| 6,532,527 | B2 * | 3/2003 | Selkirk et al. | 711/203 |
| 6,779,095 | B2 * | 8/2004 | Selkirk et al. | 711/165 |
| 6,792,518 | B2 * | 9/2004 | Armangau et al. | 711/162 |
| 7,246,211 | B1 * | 7/2007 | Beloussov et al. | 711/162 |
| 7,318,135 | B1 * | 1/2008 | Tormasov et al. | 711/162 |

* cited by examiner

*Primary Examiner*—Than Nguyen
(74) *Attorney, Agent, or Firm*—Griffiths & Seaton PLLC

(57) ABSTRACT

A system and method are described to improve the efficiency of copy-on-write operations in a storage system. A PDSS descriptor associated with partition PSS and a PDTT descriptor associated with partition PTT are maintained in a cache memory, with partition PSS associated with a source logical unit $LU_S$ and partition PTT associated with a source logical unit $LU_T$. An ICP flag is set in the PDSS and PDTT descriptors indicating that the PSS and PTT are undergoing a copy-on-write operation. Data is then dissociated with PTT and locations of each block of the PSS stored in memory are copied from the PDSS descriptor to the PDTT descriptor. A task is then created to fetch blocks of the PSS and the fetched blocks are copied from the PSS to the PTT.

6 Claims, 10 Drawing Sheets

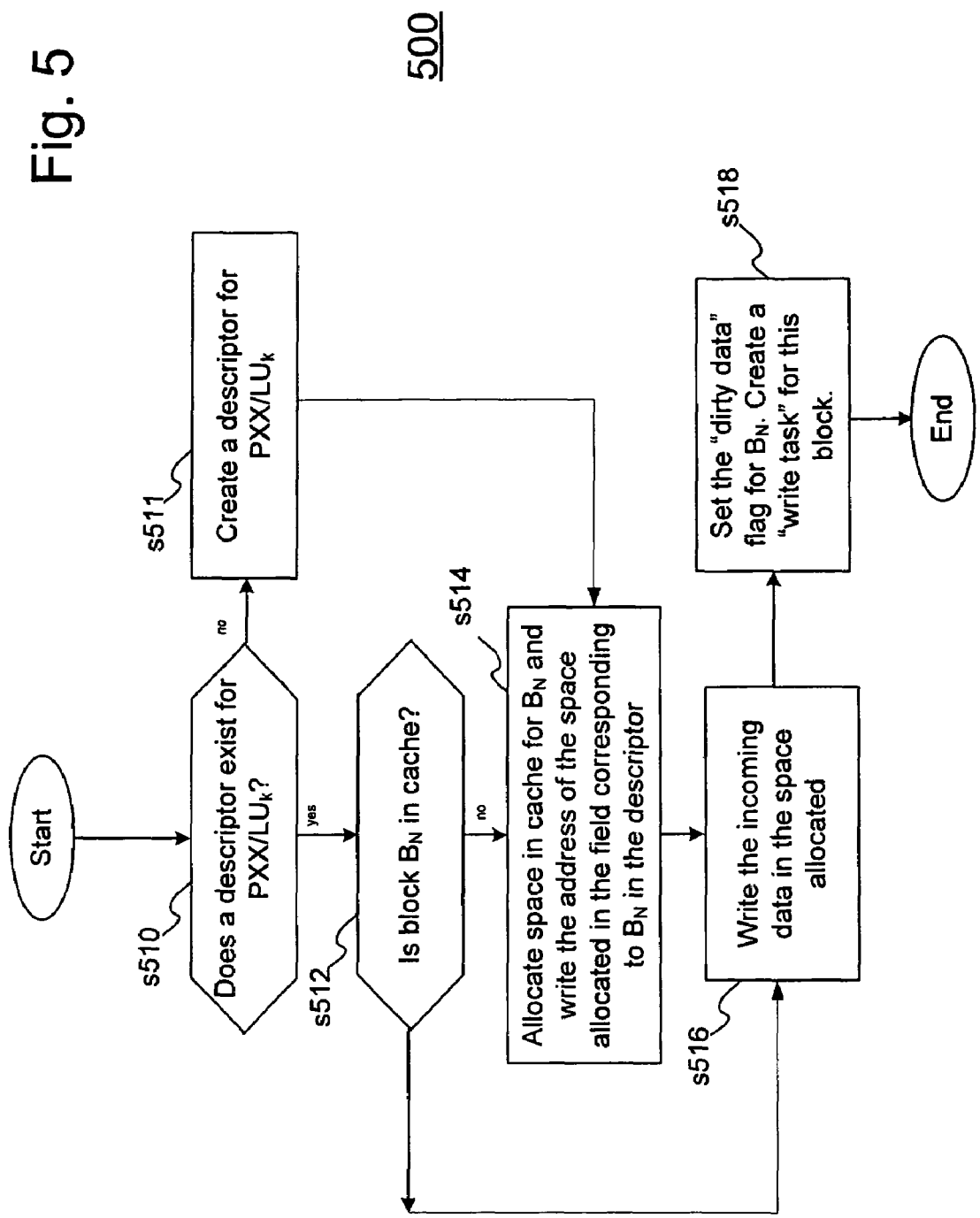

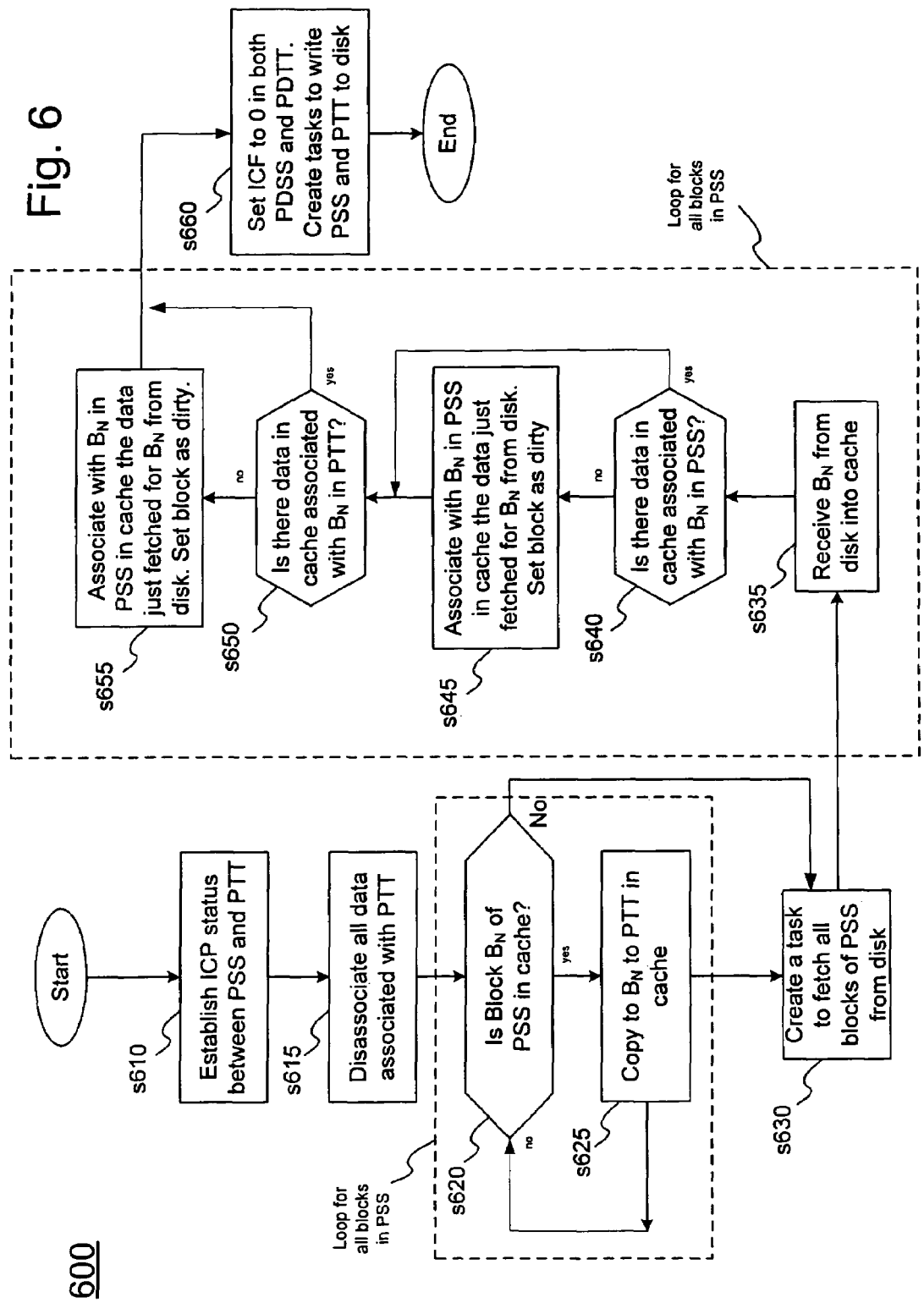

700

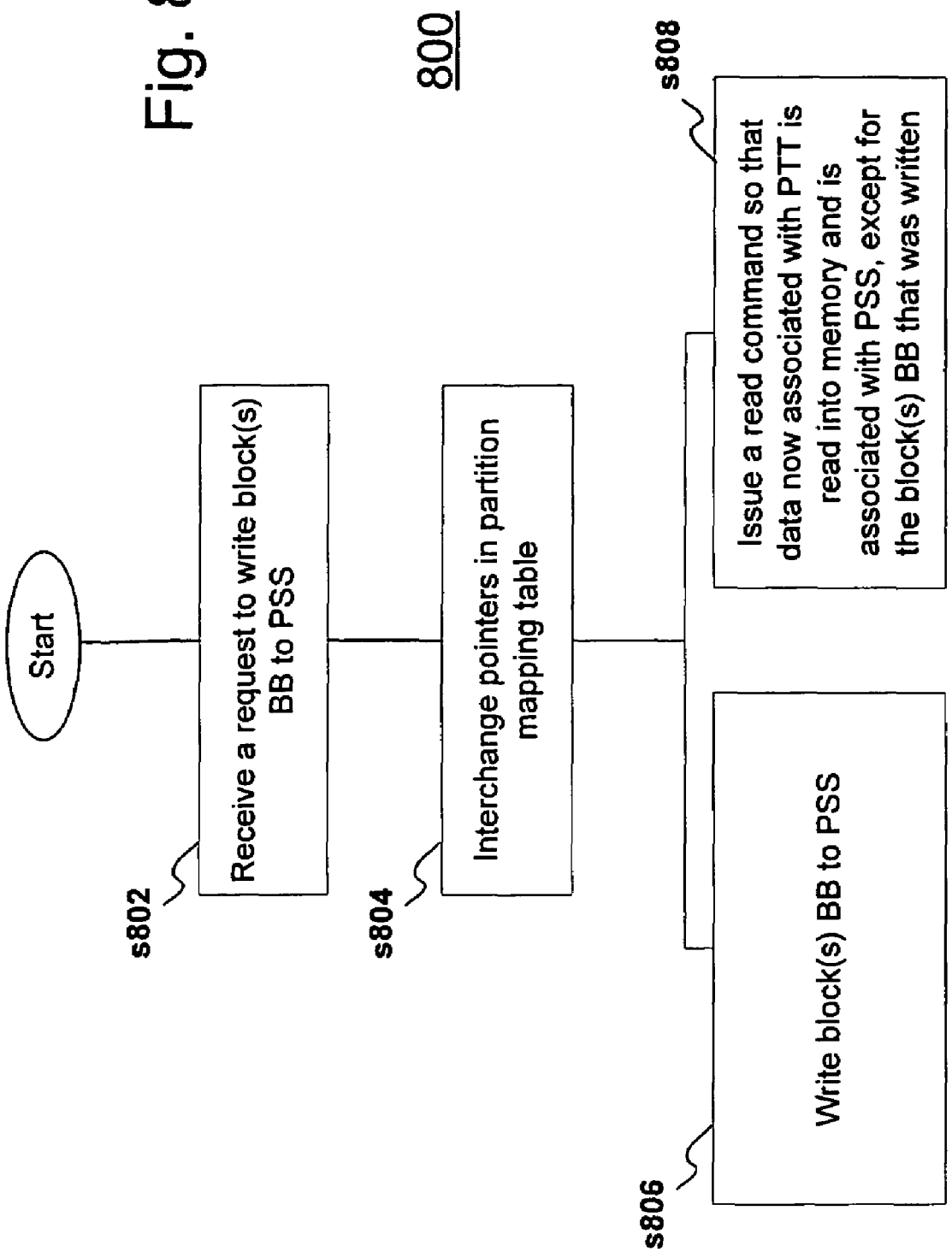

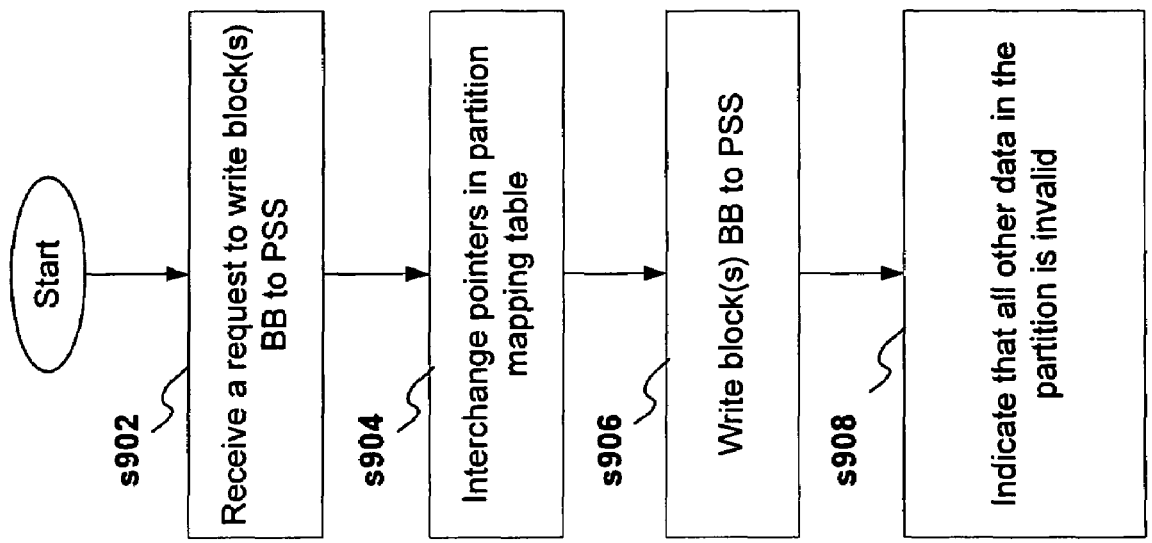

INSTANT COPY OF DATA IN A CACHE MEMORY VIA AN ATOMIC COMMAND

RELATED APPLICATION

This application claims priority to U.S. Patent Application No. 60/721,546, filed Sep. 29, 2005, which is incorporated herein by reference in its entirety. Furthermore, all documents cited in this text, and all documents cited or referenced in documents cited in this text, and any manufacturer's instructions or catalogues for any products cited or mentioned in this text or in any document hereby incorporated into this text, are hereby incorporated herein by reference. Documents incorporated by reference into this text or any teachings therein can be used in the practice of this invention. Documents incorporated by reference into this text are not admitted to be prior art. Furthermore, authors or inventors on documents incorporated by reference into this text are not to be considered to be "another" or "others" as to the present inventive entity and vice versa, especially where one or more authors or inventors on documents incorporated by reference into this text are an inventor or inventors named in the present inventive entity.

BACKGROUND OF THE INVENTION

1. Field of Invention

The present invention generally relates to the field of mass data storage in computing. It more specifically provides techniques for storing and retrieving data with improved speed and efficiency.

2. Discussion of Related Art

An essential feature implemented nowadays in mass storage systems comprises the creation of Snapshot copies of essential data units—for example, logical units ("LU"s) in storage area networks ("SAN") and File Systems in network-attached storage ("NAS") systems. Several techniques are used in creating such copies and several names are used to designate them: snapshot, instant copy, clones. The basic idea behind any such implementation is that at a given point in time a command is issued in the system and a copy is immediate created of the LU. This copy is intended to reflect the situation in the LU at the time of creation. The source LU continues to respond to input-output ("IO") activity as usual. Depending on the implementation, the copy may either remain unchanged after its creation (and thus continue to reflect the status of the source at the time of creation) or be available for use on its own, thus acting as a standard LU in all respects that can be modified at will by the user. If the copy remains unchanged, it may be used to restore the source LU to its original state at the time of creation.

Typically, the idea behind implementations of snapshot copies is that when the command is issued and the copy created, very little actual activity is performed in the system. In most implementations, metadata has to be created for internal management purposes, the size of the metadata being proportional to the intended size of the copy. Thus, even though very brief, the creation time of a snapshot is proportional to the size of the intended copy. An alternative to this is to create snapshot copies that require less metadata at the time of creation. Such an implementation is described in U.S. patent application Ser. No. 11/123,993, titled "Data Storage Methods for Hierarchical Copies," filed May 6, 2005.

The real data copying activity takes places not at the time of creation of snapshots, but rather whenever data is written to the source LU or to the copy. Indeed, LUs typically comprise sequence of data blocks, the sequences being of varying lengths and the blocks being of equal sizes. Managing the LU within the system is typically done in terms of partitions comprising a fixed number of blocks. At the time of creation of the snapshot, the source LU ("$LU_S$") and the target LU ("$LU_T$") share all data, and no physical copy of the data is actually created. If the user wants to read data from $LU_T$, an internal system of pointers that is transparent to the user will indicate that this data has to be read from the partition which contains the original data and is associated with $LU_S$. If at some point in time data is written for the first time to a partition in $LU_S$, the system will create a new physical partition where this data is written and this modified partition is then associated to $LU_S$, whereas the original partition remains associated with $LU_T$. This basic mechanism known as "copy on write" is the basic mechanism typically implemented to allow the correct management of snapshots with minimal creation of physical data. After this step, two partitions exist in the system: the original one remains associated with $LU_T$ and continues to reflect the state of data in $LU_S$ at the time of establishing the copy, and the new data is in the newly created partition and it is associated with $LU_S$ that continues to work as usual. New modifications of this partition will not affect $LU_T$ anymore. However, since new partitions are created only when the associated data is modified, in the typical case only a small percentage of partitions exists both in the new and in the old version, whereas much of the data continues to be shared by $LU_S$ and $LU_T$ via pointers.

The step of "copy on write" is then the stage where most of the actual copy activity takes place. Whereas snapshot creation involves virtually no overhead activity and thus the overall activity parameters of the system are virtually unaffected at the time of snapshot creation, each "copy on write" activity involves a considerable latency penalty for the individual IO request involved. Thus, for instance, let PSS be a partition associated with LUs and composed of a sequence of blocks that is to be copied as part of a "copy on write" process to PTT, associated with $LU_T$. Assume a write request is now received from the host, involving one or more blocks BB that is to be written to PSS, so as to modify it for the first time and to create an actual copy of it. Let PTT be the partition that is created and will be associated with the data that was associated with PSS before the operation. In order to perform this request the cache typically performs the following steps: (1) read from disk the entire partition PSS; (2) create a copy the data of PSS and associate it to PTT; (3) write BB to PSS according to the request. Thus, whereas write requests are usually serviced immediately by the storage system, under a "copy on write" situation the request had to wait until read task (1) was completed before it could complete and acknowledge the write request for block(s) BB.

Whatever the precise merits, features, and advantages of the above-mentioned techniques, none of them achieves or fulfills the purposes of the present invention.

SUMMARY OF THE INVENTION

To overcome the above shortcomings and to improve upon the efficiency of conventional "copy on write" operations, the present invention comprises a method for implementing an "instant copy process" and "copy on write" operations within a module, which may include one or more of a cache memory and a disk controller, in a storage system with snapshot mechanisms, such that individual write requests are performed with sensibly lower latencies.

BRIEF DESCRIPTION OF THE DRAWINGS

The following Detailed Description, given by way of example but not intended to limit the invention to specific embodiments described, may be understood in conjunction with the accompanying figures, incorporated herein by reference, in which:

FIG. 5 is a schematic block diagram of an algorithm including steps taken at a cache module whenever a write request, directed to a partition that falls under the responsibility domain of the cache module, arrives in the cache module from one of the components of a storage system in accordance with an embodiment of the invention;

FIG. 6 is a schematic block diagram of an algorithm including steps of an instant copy process ("ICP") of a partition of data in accordance with an embodiment of the present invention;

FIG. 8 illustrates a "copy on write" process having a reduced number of steps according to another embodiment of the present invention; and FIG. 9 illustrates a "copy on write" process having a reduced number of steps according to yet another embodiment of the present invention.

DESCRIPTION OF THE PREFERRED EMBODIMENTS

Figure 1:
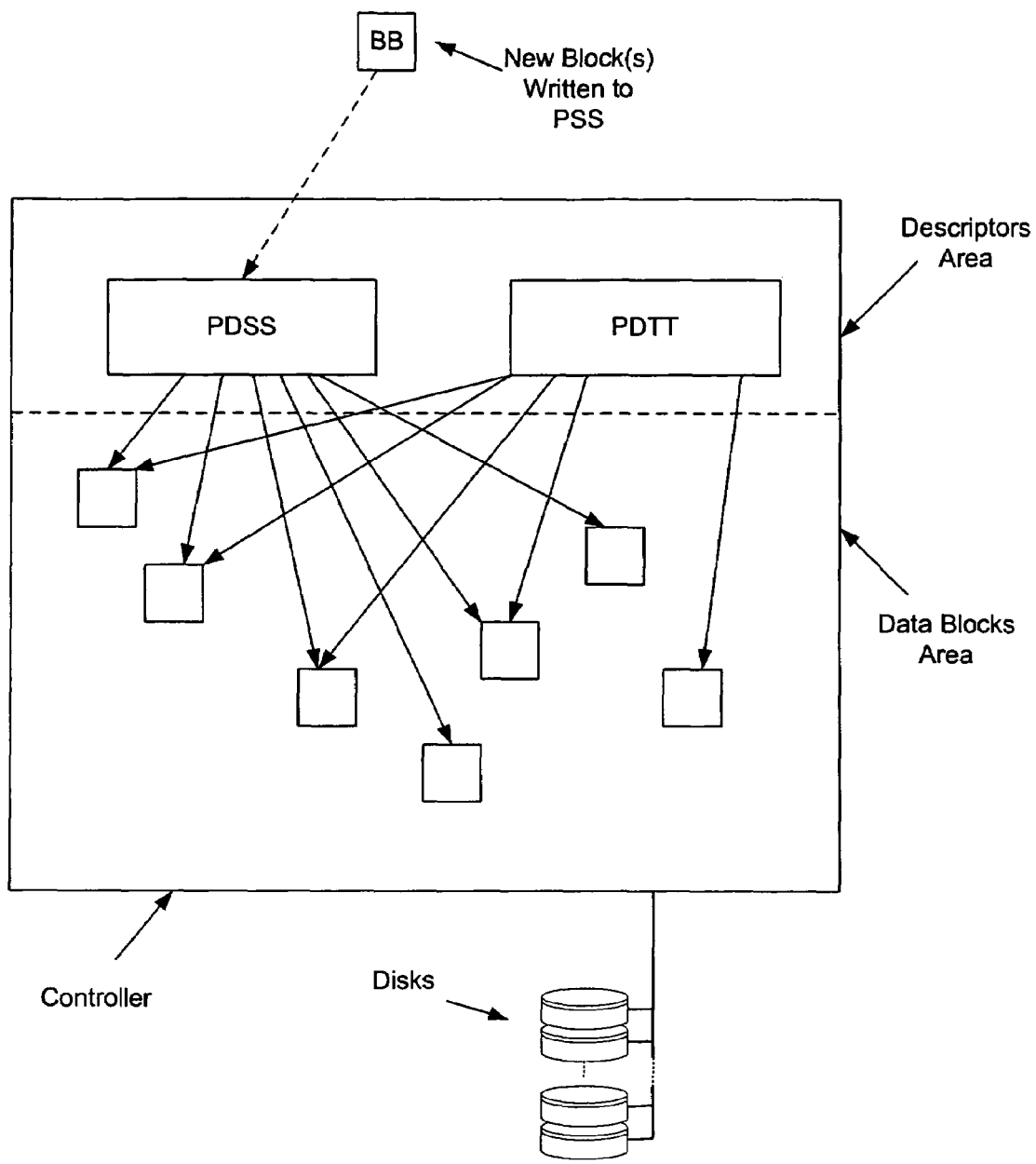
FIG. 1 is a block diagram for illustrating a scenario for "copy on write" operations.

FIG. 1 is a block diagram for illustrating a scenario for "copy on write" operations. The present invention includes techniques for improving the efficiency of "copy on write" operations. The present invention may be implemented in a disk controller module, a cache module (which may include disk control functionality), or in some other implementation of a memory module connected to one or more disk drives, or equivalent storage apparatus(es). For simplicity of illustration, the terms "controller," "control module," "cache" and "cache module" may be used interchangeably to designate such implementation of the invention. A cache module, which may include a disk control module, may have a partition descriptor for each data partition it handles. Thus, for instance, PDSS may be designated as the descriptor associated with PSS, and PDTT may be designated as the descriptor associated with PTT. The descriptor may indicate, among other things, the location in memory of each of the blocks associated with a partition that are currently stored in the memory of the cache module. The cache module may further include one or more pointers associated with its disk control functionality that may indicate, among other things, the exact physical location, on disk, of the data associated with each partition.

Figure 2:
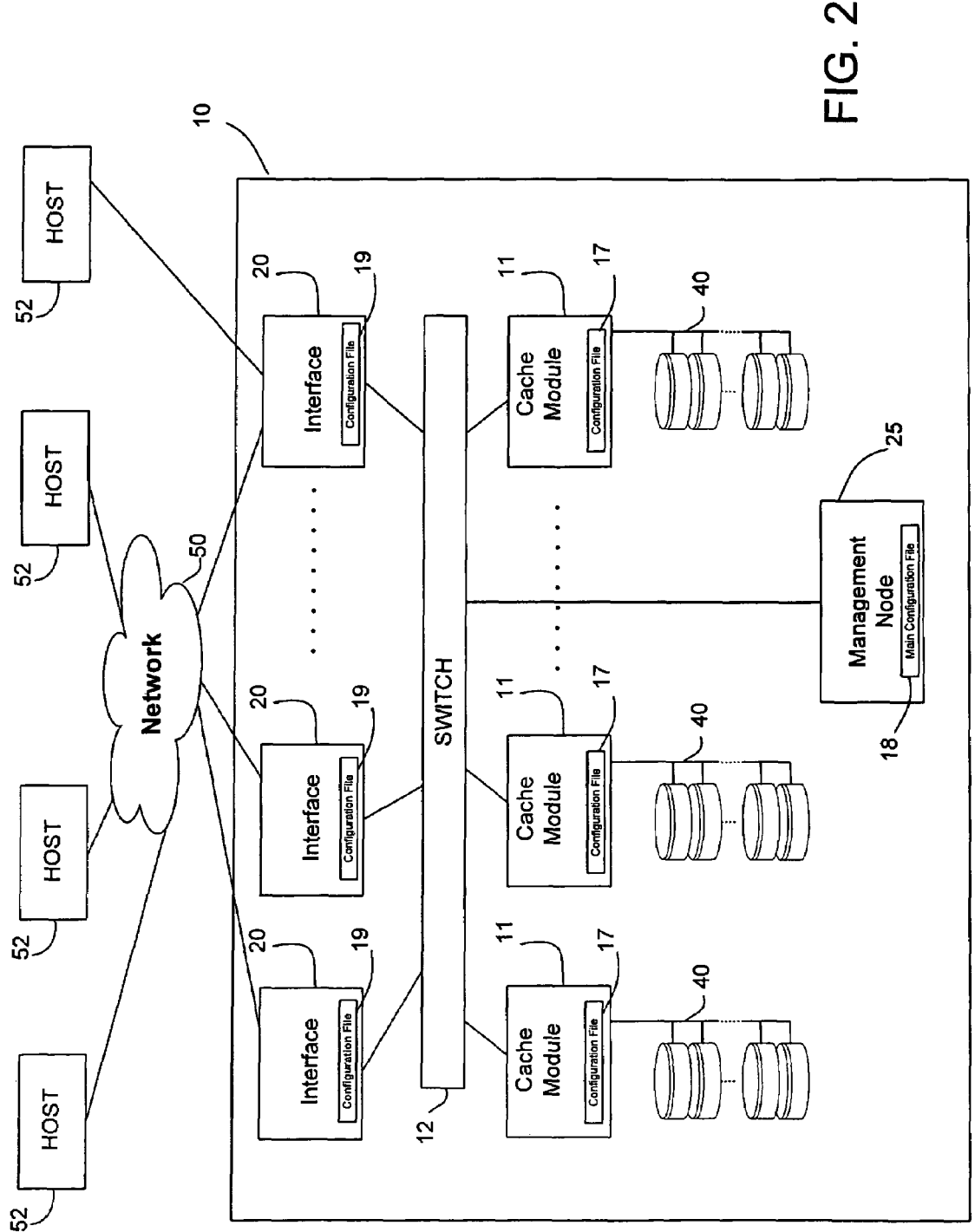
FIG. 2 is a schematic block diagram of a storage system 10 in accordance with an embodiment of the present invention.

FIG. 2 is a schematic block diagram of a storage system 10 according to an embodiment of the present invention. One or more host computers 52 may be connected to a storage system 10 through ports, or interfaces ("IFs"), 20, either directly or via a network 50. The system 10 may comprise a distributed cache built as a cluster of several modules 11 acting in a synchronized way. The IF components 20 may communicate with the cache modules 11 over a fabric switch 12, and the cache modules 11 may also communicate with each other over the same switch 12. The cache modules 11 may function as disk controllers, each cache module 11 being connected to one or more disk drives 40.

The system 10 may also include a Management Module 25 that operates either from a host 52 or from a separate console, and that issues "management commands" to the system 10. Such management commands may include, but are not limited to, creation, deletion and property modification of LUs, copy commands (such as for the instant copying of the present invention) and others that may be described as being activities in the system 10 other than pure IO transactions. As an example, the system 10 may comprise a single Management Module 25, but this functionality may be embodied in several separate and coordinated modules, and the system 10 may also comprise a redundant type of Management Module 25.

Management module 25 may maintain a database called "Main Configuration File" 18, in which the essential structure and configuration of the system 10 is described. Modifications to the configuration may be implemented by changing the relevant features in the Main Configuration File 18, and then broadcasting it to the various modules in the system 10 that may maintain files comprising partial copies of Main Configuration File 18. Thus, the IFs 20 may each maintain a Configuration File 19, with information that is relevant to its functioning and that may be taken from file 18, whereas the caches modules 11 may each maintain a Configuration File 17, with information that is relevant to its functioning and that may also be taken from file 18. When a host 52 issues an IO request directed to a certain $LU_N$, the corresponding IF 20 receives this request and translates it in terms that are relevant to the internal workings of the system 10. The IF 20 may, for instance, divide the request into sub-requests that are directed to data portions that the system 10 knows how to handle. In an embodiment of the present invention, system 10 may be adapted to handle requests in terms of sequences of consecutive blocks called partitions. Partitions and their functionality are described in greater detail below. Configuration File 19 may contain information indicating which cache module 11 is responsible for handling any given partition in the system 10. According to this information, interfaces 20 may direct any request related to a partition to the cache module 11 that handles it. Further, Configuration File 17 in the cache module 11 may contain information indicating which of the disks 40 associated with it is the one where a physical copy of a given partition handled by that cache module 11 is stored. This information may be used in any transaction between the cache module 11 and the disk 40, such as storing the partition on the disk 40 or retrieving the data associated with the partition into cache module 11.

Figure 3:
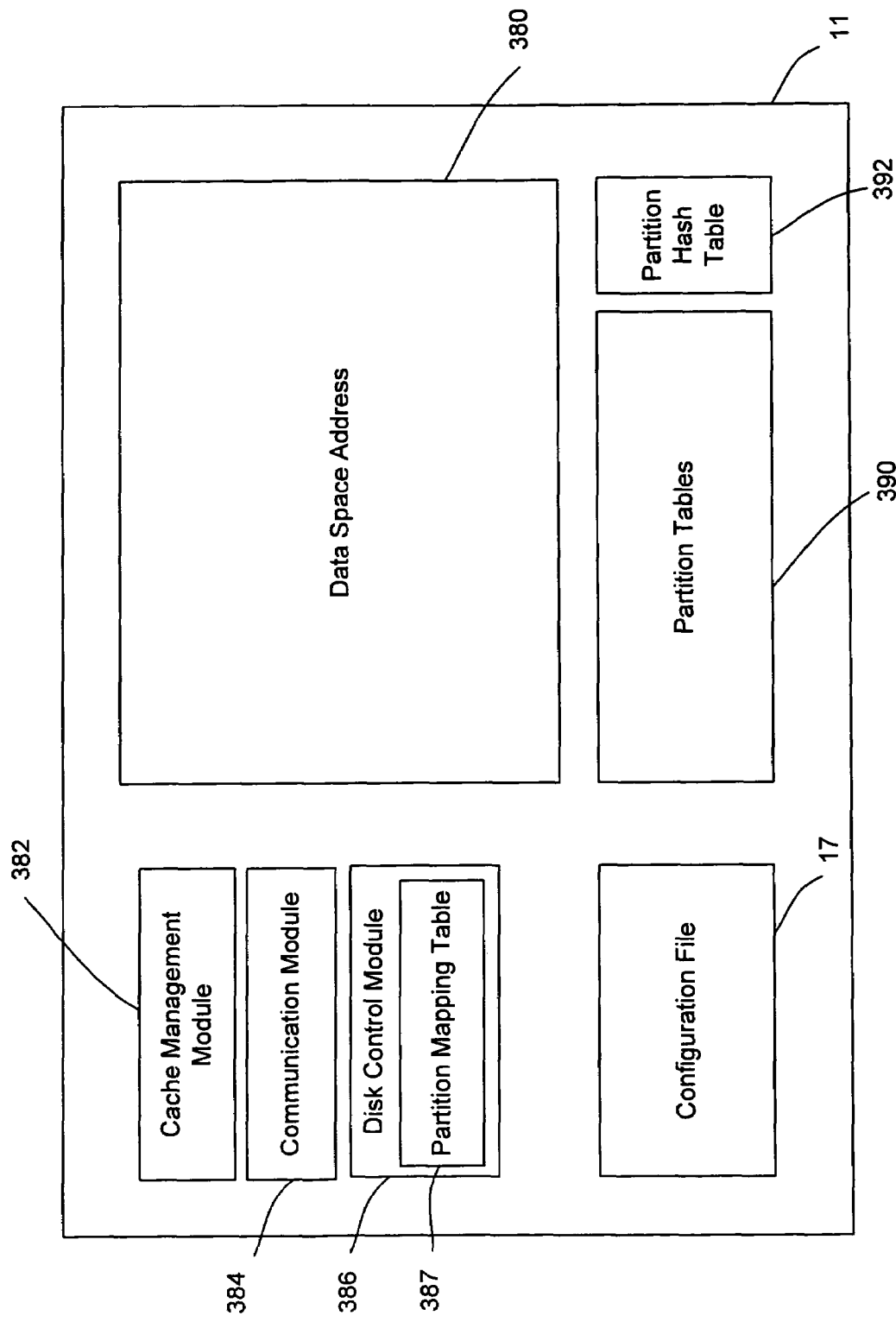
FIG. 3 illustrates a cache module within a storage system according to an embodiment of the present invention.

FIG. 3 illustrates a cache module 11 in accordance with an embodiment of the present invention. The cache module 11 may contain an address space area 380 where the data handled by the cache module 11 is stored. The cache module 11 may also contain a Partition Table 390 where the "partition descriptors" are stored. Partition descriptors are described in greater detail below with reference to FIGS. 4a-4c. The cache module 11 may also contain a Partition Hash Table 392, used to localize partitions currently handled by the cache 11. Whenever a partition descriptor is added to table 390 or deleted from it, table 392 may be updated accordingly. The cache module 11 may also contain a Cache Management Module 382 that manages the activities performed in it. The cache module 11 may also contain a Communication Module 384 for communicating with other components in the storage system 10, and a Disks Control Module 386 that manages the interaction between the cache module 11 and the disks 40 associated with it.

Disk control module 386 may store a partition mapping table 387 that translates logical definitions into physical locations. For example, when a request arrives to write blocks 50 to 750 in a logical unit $LU_1$, the IF 20 may divide the blocks into 8 partitions. Blocks 50 to 99 may form a first partition; blocks 100 to 199 may form a second partition; and so forth. Partition mapping table 387 may indicate where the string of blocks corresponding to, say, the second partition, into which the data associated with this logical strings of blocks is to be written, is located on the disks 40 connected to the controller, e.g., disk control module 386. In an exemplary embodiment, the partition mapping table 387 comprises a series of pointers that translate logical partitions into physical partitions. For example, an entry in the partition mapping table 387 could look like:

LP00002/LU1→PP012345/D3

The above entry specifies that the logical partition 02, of logical unit $LU_1$, is in physical partition 012345 of disk 3 associated with this controller.

It is important to note that a pointer may exist even if a partition has never been written in the system and data has never been associated with it. Such a pointer may—in, for example, a static allocation procedure—exist because the instance $LU_1$ may be defined in the system and associated with a capacity, and the management module may translate this into partitions and inform the controllers (the cache modules) that they need to prepare physical space on the disks because this partition will be written in the future. The controller may immediately organize itself internally and have now, in its partition mapping table, a pointer for each logical partition that comprises the new LU, and these pointers may indicate that there is a physical location on the disks dedicated to this data. It should be noted that the controller can manipulate these pointers while maintaining one pointer for each logical partition defined in the system. In the case of dynamic allocation procedures, even when a pointer has not always been defined for all partitions at a given point in time, it may nevertheless exist for many partitions whose associated data is not currently stored on the disks, and it may exist for all partitions whose associated data is currently stored on the disks.

In an alternative embodiment of the invention, the Communication Module 384 and the Disk Control Module 386 may form an entity separate from the cache module 11.

The cache module 11 may include a local copy of Configuration File 17. In an alternative embodiment, the Partition Table 390 may be part of the Configuration File 17. But since the information in the Partition Table 390 may be relevant only locally—at the level of the cache module 11 and its associated disks 40—and irrelevant to other functional components in the system 10, it is defined here, for convenience and simplicity of illustration, as not being part of the Configuration File 17.

Figure 4A:
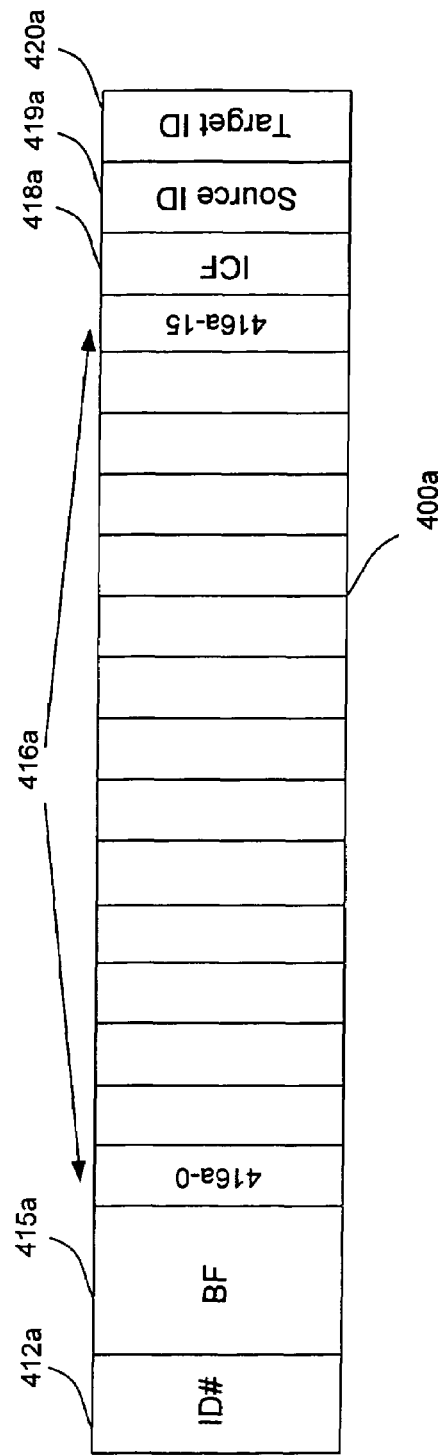
FIG. 4a illustrates a Partition Descriptor in a Partition Table according to one embodiment of the present invention.

FIG. 4a illustrates a Partition Descriptor 400a in Partition Table 390 according to one embodiment of the present invention. A cache module 11 may contain one Partition Table 390 per each disk 40 associated with it. A partition may be a virtual unit of data with which a sequence of consecutive blocks are associated. In one embodiment of the present invention, all partitions may be equal in size, each comprising 16 consecutive blocks in storage system 10. The partition descriptor 400a may comprise a first field 412a indicating the serial number ("ID#") of the partition to which it belongs (from 0 up to some number n). The descriptor 400a may contain a Block Flags field 415 ("BF") used for operative information related with each of the blocks associated with the descriptor 400a. Further details on the structure of this field are provided below.

Figure 4B:
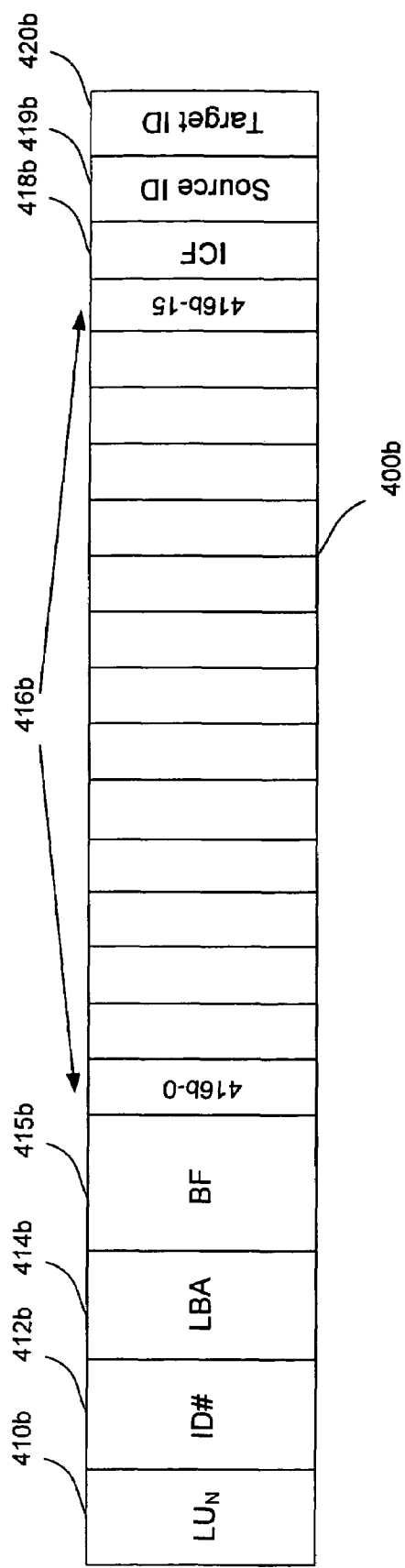
FIG. 4b illustrates a Partition Descriptor in a Partition Table according to an alternative embodiment of the present invention.

FIG. 4b illustrates a Partition Descriptor 400b in Partition Table 390 according to an alternative embodiment of the present invention. Again, a cache 11 may contain one Partition Table 390 per each disk 40 associated with it. A partition may be a virtual unit of data with which one associates a sequence of consecutive blocks in a LU. In an embodiment of the present invention, all partitions may be equal in size, each comprising 16 consecutive blocks associated with a LU in storage system 10. The partition descriptor 400b may comprise a first field 410b indicating a number ("N") of the LU with which the partition is associated and a second field 412b indicating the serial number ("ID#") of the partition within the $LU_N$ to which it belongs (from 0 up to some number n, depending on the size of the LU). The descriptor 400b may also contain a field 414 indicating the physical address of the partition on the disk 40 where it is stored, which may be written as the logical block address ("LBA") on the disk 40 of the first block of the partition. The descriptor 400b may contain a Block Flags field 415b ("BF") used for operative information related with each of the blocks associated with the descriptor 400b. Further details on the structure of this field are provided below.

In both the embodiments shown in FIGS. 4a and 4b, the descriptor 400 (i.e., 400a or 400b) may also contain sixteen fields 416 (i.e., 416a or 416b), one for each of the blocks associated with it. As an example, fields 416a-0, ..., 416a-15 are illustrated for descriptor 400a in FIG. 4a. For simplicity of illustration, the description hereinafter of descriptor 400 and its components may refer to either 400a illustrated in FIG. 4a or 400b illustrated in FIG. 4b. Fields 416 may indicate the physical address of the current location of the respective block in cache module 11. It may contain a negative number to indicate that a respective block is not currently in cache module 11. For convenience, it is assumed that the configuration files 17 are so built that partitions corresponding to the same LBAs of any given LU are all handled in the same cache module 11 and in the same disk 40. U.S. patent application Ser. No. 10/620,080, titled "Data allocation in a distributed storage system," filed Jul. 15, 2003, which is incorporated herein by reference, describes one way to create configuration tables with this property. The partition descriptor 400 may also contain an Instant Copy flag ("ICF") 418 to indicate that the partition is undergoing a "copy on write" process, as explained below. Thus, for instance, if the value of this flag is set to 0, then it may be understood that an instant copy process ("ICP") for this partition is underway, whereas any other value may indicate the opposite. In addition, the descriptor 400 may contain two fields that define the ICP: a field 419 indicating the ID of the partition that provides a source from which the ICP is performed to this partition, and a field 420 indicating the ID of a partition that acts as target to which the current ICP is performed from this partition. As will be seen below, it is possible that a partition acts simultaneously as source and target for ICPs.

Figure 4C:
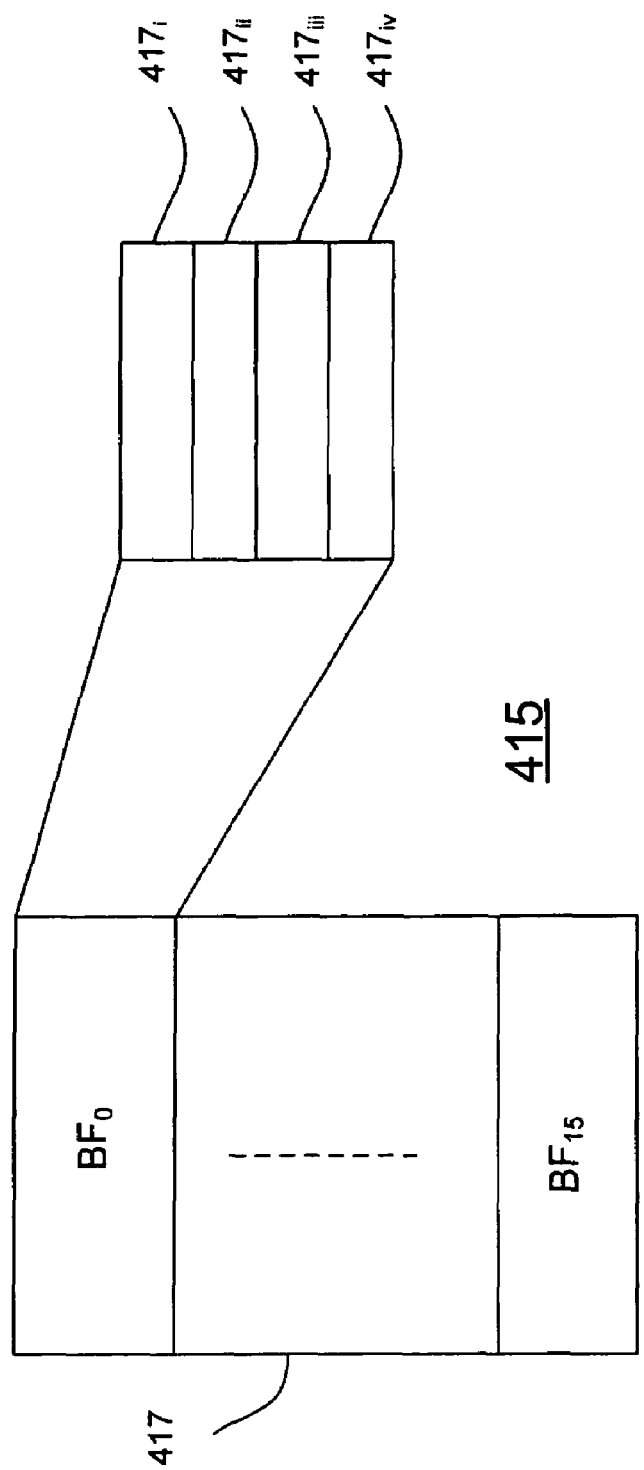
FIG. 4c illustrates a Block Flags field in a Partition Descriptor in accordance with an embodiment of the present invention.

FIG. 4c represents a schematic description of a Block Flags field 415 ("BF") in Partition Descriptor 400 of an embodiment of the present invention. The BF 415 may contain one nibble (four bits) for each block associated with the partition, for example, sixteen nibbles 417: $BF_0, \ldots, BF_{15}$. Each of the four bits may be used in the system 10 to indicate a certain status associated with the block in question. Thus, for instance, in an embodiment of the present invention if bit $417_i$ is set to 1 that may indicate that the block contains "dirty data" (i.e., data yet to be written to disk 40), if bit $417_{ii}$ is set to 1 that may indicate that the data in the block is invalid. Accordingly, additional information that is relevant to the managing the partition and its associated blocks in the system 10 may be incorporated in nibbles 417.

In accordance with an embodiment of the invention, a new method may be used for implementing "copy on write" operations in such a way that the latency of individual write requests is performed without the typical penalties associated with implementations known in the art.

The method consists in defining an atomic command called "Instant Copy Process" ("ICP") that comprises the following steps:

a) use an ICP flag in the descriptors PDSS and PDTT (of the embodiment shown in FIG. 4a) to indicate that both PSS and PTT are undergoing an ICP process, b) disassociate all data currently associated with PTT (i.e., by erasing in the PDTT all the locations of the blocks of PTT currently stored in memory), c) copy from PDSS to PDTT the locations of each block of PSS currently stored in memory (this means that data blocks associated with PSS and currently stored in memory will have been "immediately copied" to PTT, and currently associated with PTT and are stored in memory as well), and d) issue a read request from the controller to disk to read all blocks of data associated with PSS.

This atomic command takes "zero time" to complete and once it is completed PSS is considered to have been copied to PTT. The entire process, however, continues in the background and the ICP is used to control the coherence of data until the background process is completed. In order to do so, the following steps are taken:

1) No destage tasks associated with PTT are performed while the ICP flag is set, 2) Any request to write a block into PTT is serviced normally, 3) Any request to read a block from PTT is performed only after the block has been reassigned from PSS to PTT (one might call this "until the block has been copied from PSS to PTT"). Read requests to PTT do not trigger new tasks to bring data from the disk, since the data currently associated with PTT in the disk is invalid due to the copy operation.

4) The blocks of PSS that were not in memory arrive gradually from the disk. At the time of arrival of block(s) BB the controller copies from PDSS to PDTT the locations of assigned in memory to block(s) BB. This means that data block(s) BB has been "immediately copied" to PTT, and is currently associated with PTT and stored in memory as well. This step is skipped if it turns out that some data is already associated with that block in PDTT, since this would mean that the block was written to PTT after the ICP status was established between PSS and PTT, and therefore the current value is the one that must remain associated with PTT rather than the one that would be copied from PSS.

5) Any request to write a block to PSS is accepted and when the block arrives from the disk (since it was requested as part of the atomic ICP process) it is not associated to PSS but only to PTT (subject to the constraint in step (4)) When all the blocks of PSS have arrived from the disk, the background process is complete and the ICP flags of both PDSS and PDTT can be set again to 0, so that both PSS and PTT return to normal operation.

FIG. 5 represents a schematic block diagram of an algorithm 500 describing the steps taken at a cache module 11 whenever a write request arrives in the cache module 11 from one of the components of storage system 10, the write request being directed to a partition that falls under the responsibility domain of the cache module 11 in question as defined in configuration file 17. Assuming, by way of example, that a request reaches the cache module 11 to write block $B_N$ of a partition with ID# "PXX" in $LU_k$. In a first step s510 of algorithm 500, cache management module 382 may trigger a search routine on hash table 392 to see if a partition descriptor 400 exists for PXX of $LU_k$. If a partition descriptor 400 for PXX/$LU_k$ does not exist, then in a next step s511, cache management module 382 may create a descriptor 400 and continue to step s514. If a partition descriptor 400 for PXX/$LU_k$ exists, then in a next step s512, cache management module 382 may check if field 416-N corresponding to block N ($B_N$) in partition PXX/$LU_k$ is currently in cache module 11. This may be indicated by a value in the field that points to the address of the space currently allocated to the block in cache module 11, or by a value 0 if the block is currently not in cache module 11. If the block $B_N$ is not in cache module 11, then in a next step s514 the cache management module 382 may allocate the necessary space in cache module 11, and may write in field 416-N address of the space just allocated for this block $B_N$ in the Data Space Address 380. In a next step s516, the cache management module 382 may write the data associated with the write request in the space associated with block $B_N$. This may be the space just allocated in step s514 or the space previously associated and detected at step s512.

In a next step s518, the cache management module 382 may set the value of bit $417_i$ in Block Flag $BF_N$ of field 415 in partition descriptor 400 to indicate that block $B_N$ contains dirty data that should eventually be written to disk 40. At the same time, the cache management module 382 may create in Disk Control Module 386 a write task associated with block $B_N$ of partition PXX/$LU_k$ and may add it to a write tasks queue managed in Disk Control Module 386. U.S. patent application Ser. No. 11/165,976, titled "Method, System and Circuit for Managing Task Queues in a Disk Device Controller", filed Jun. 25, 2005, which is incorporated herein by reference, describes one way to handle such task queues. Algorithm 500 ends here. Eventually, when this write task from cache module 11 to disk 40 is completed, the Disk Control Module 386 may indicate to cache management module 382 that bit $417_i$ in Block Flag $BF_N$ of field 415 in partition descriptor 400 may be set again to 0, to indicate that block $B_N$ does not contains dirty data. Knowing that a certain block or blocks currently in cache contain dirty data is fundamental for the management of any cache. For instance, when the cache management module 382 needs to allocate new memory space for new data to be written to the cache module 11 (such as was the case in step s514 above), it may need to discard some data currently in cache module 11, but cannot discard any data associated with a block containing dirty data.

FIG. 6 represents a schematic block diagram of an algorithm 600 describing the steps taken at cache module 11 in order to perform an instant copy process ("ICP") command of a partition of data in an embodiment of the present invention. Algorithm 600 allows copying of the contents of a given source partition PSS in a $LU_m$ to a target partition PTT in a $LU_n$ as an atomic operation performed in "zero time", even in cases where the data blocks associated with PSS are not in cache module 11 and must be retrieved from disk 40—thus involving actual disk 10 activity. At a given point in time, partition PSS may be stored in its entirety in a disk 40, without any of its blocks being in cache module 11. Copying PSS to PTT means copying each of its blocks, and since this is done in cache module 11, the blocks must either be in cache module 11 at the time that the ICP command is issued or be brought thereafter. While this process is underway algorithm 600 keeps track of IO activity being directed to these two partitions so that all operations involved in this complex situation can be completed while preserving coherency throughout.

For the sake of simple illustration, the algorithm 600 as described herein assumes that the two partitions PSS and PTT are of equal size, i.e., to contain the same number of blocks. It also assumes that when the command is issued, the cache module 11 contains two partitions descriptors 400, one for PSS and one for PTT. This assumption is trivial in the sense that cache management module 382 may be adapted, as part of its normal functioning, to produce the partitions whenever needed. The descriptors 400 are called here PDSS and PDTT, respectively. Further, it is assumed, for a simpler description of algorithm 600, that neither PSS nor PTT is currently involved in any ICP process. This assumption is not the only possible case, and thus, additional exemplary cases are described below in detail in terms of the steps of algorithm 600.

In a first step s610 of algorithm 600, cache management module 382 may perform a preliminary process establishing the ICP status between PSS and PTT. This step may comprise the following: (1) The Source ID field 419 of PDTT may indicate the source partition to be copied to PTT (in this case PSS/LU$_m$) and the Target ID field 420 of PDSS may indicate the target partition for copying from PSS (in this case PTT/LU$_n$); (2) ICF 418 may be set to 0 in both PDSS and PDTT. Flag ICF 418 set to 0 may indicate that these partitions are undergoing an ICP process, and this may provide an indication to the cache management module 382 that data associated with these partitions should not be destaged as long as the process is underway. This may prevent data currently associated with PSS to be modified by write requests until the entire algorithm 600 is completed. The completion of this step s610 signifies establishing the instant at which the ICP command is issued, and the contents of PSS at this time would be the contents that would be reflected in PTT at the end of the algorithm 600.

In a second step s615, cache management module 382 may disassociate PTT from each data block currently associated with it in cache module 11 (so that in the following steps of the algorithm 600, the data associated with PSS would end up being associated with PTT). This may be done by writing 0 to each of the fields 416-0 to 416-15 in PDTT. In an alternative embodiment, the cache management module 382 may be adapted to restore the memory spaces corresponding to the blocks disassociated in this step s615 to a "free space" reservoir that may then be used for its own purposes. It should be noted that if any block associated with PTT contains dirty data waiting to be destaged to a disk 40, this data would not be relevant anymore since in the end what would be written to disk 40 in association with PTT would be the data that would arrive from PSS in association with that block. Thus, when the time comes for the cache module 11 to handle the write tasks associated with this dirty block, and it may be in the write task queue at the time of the ICP command, the ICF 418 of PDTT (currently set to 0) may indicate that this task may be aborted.

In a next step s620, cache management module 382 may successively check for each of the blocks B$_N$ of PSS if the data associated with the block is currently cached, by looking at field 416-N of PDSS: if the value stored in field 416-N is 0, that means that the data corresponding to this block is currently not in cache module 11. If the data associated with B$_N$ is currently not in cache module 11, nothing is done for the block.

If the value stored in field 416-N is different from 0 [i.e., if the data associated with this block is currently in cache module 11] that value represents the physical address in the Data Address Space 380 where the corresponding data is stored. Thus, in a next step s625, cache management module 382 may copy this value into field 416-N of PDTT, and at the same time it may set bit 417$_i$ in BF$_N$ (of PDTT) to 1, so that the data is marked as dirty. In this way, the block is "instantly copied" from PSS to PTT in cache and it may eventually be written to the disk 40 in association with PTT (but not while algorithm 600 is still underway because ICF is set so that no destage takes place for either PSS or PTT). In a next step s630, cache management module 382 may trigger a fetch task ("FT") for fetching from disk 40 into cache module 11 successively each block of partition PSS, so that data that is not yet "instantly copied" from PSS to PTT in step s625—because it is not in cache module 11—may be copied, and thus eventually completing the ICP. It should be noted that steps s610-s630 are all performed in memory and they involve no IO activity between disk 40 and cache module 11. This may be defined as a "zero time" command. The rest of the operation may be completed as a background process, continuing algorithm 600 whose details are defined as follows. While steps s610-s630 are underway, the system 10 may enforce a lock situation on both PSS and PTT, meaning that no activity on them is allowed, except activity related to steps s610-s630. Once process FT of step s630 is triggered, the lock may be removed, and IO activity may once again be directed at both PSS and PTT. Below it is explained how the described embodiment manages IOs directed at PSS and PTT while the next steps of algorithm 600 are underway and until their completion. The next steps in algorithm 600 [i.e., s635 to s660] take place successively for each block B$_N$ of PSS, upon its arrival in cache module 11 in response to task FT of step s630.

In a step s635 the cache management module 382 may, as part of its standard functioning, store block B$_N$ in address ADDX in cache module 11.

In a next step s640 cache management module 382 may check if there is some data currently associated in cache module 11 with B$_N$ of PSS. If there is no data currently associated in cache module 11 with B$_N$ of PSS, then in a next step s645 cache management module 382 may write the value ADDX in field 416-N of PDSS. In this way, data that is associated with B$_N$ in PSS on the disk 40 at the time ICP is issued is associated once again with B$_N$ in PSS in cache module 11, so that in this step no data association is modified. Still, since the data needs to be brought for possible use in PTT (in step s655 below) it is also now in cache module 11 and associated with PSS. If there is data associated in cache module 11 with B$_N$ of PSS, then no action is taken here. This is data that either is dirty when the ICP is issued and is already copied to PTT (in step s620), or may have become associated with PSS after the ICP is issued (in ways explained below). Therefore it needs not be overwritten with data that was associated with PSS before the ICP was issued.

In step s650 cache management module 382 checks if some data is associated in cache module 11 with B$_N$ of PTT. If there is no data associated in cache module 11 with B$_N$ of PTT, then in a next step s655, cache management module 382 may write the value ADDX in field 416-N of PDTT. In this way, data that is associated with B$_N$ in PSS on the disk at the time ICP is issued is now associated with B$_N$ in PTT in cache module 11, as required by the copy process. It should be noted that even if B$_N$ in PSS were to be modified in cache module 11 after the atomic ICP is completed (steps s610-s630), this would not change the fact that B$_N$ is copied to PTT with the value it had at the time of ICP, since ICF prevents the modified value of $B_N$ in PSS to be written to the disk 40, according to the embodiment of the present invention. In addition, Bit 417$_i$ in $BF_N$ (of PDTT) is set to 1, so that the data is marked as dirty and eventually destaged into disk 40, after completion of algorithm 600.

If there is data associated in cache module 11 with $B_N$ of PTT, then no action is taken here. This is data that becomes associated with PTT after the ICP is issued (in ways explained below). Therefore it needs not be overwritten with data that was associated with PSS before the ICP was issued.

After this step has been completed for all blocks $B_N$ of PSS, in step s660 cache management module 382 sets ICF 418 of both PDSS and PDTT to 1, so as to indicate that these two partitions are not undergoing an ICP process anymore. It also issues a destage task for each partition, so that the dirty data currently associated with each of them would eventually be written to disk 40, as part of the normal functioning of the cache module 11.

It should be pointed out that whereas algorithms 500 and 600 have been described here for an embodiment of the present invention in the case of a write request comprising a single block $B_N$, those well-versed in the art will have no difficulty in expanding the procedure described herein to write requests comprising more than one data block. As already mentioned, algorithm 600 is devised to allow for a coherent handling of continued IO requests, both read and write, directed at either PSS or PTT during the background process that takes place in steps s635-s660. To see why this is so, four different cases can be considered:

1. Request to Write to PSS: If a write request WR reaches the cache to write new data associated with block $B_N$ of PSS while PSS is undergoing an ICP process, the request would be serviced normally, and the new data is eventually associated with PSS by writing to field 416-N of PDSS the space address where the data corresponding to WR is stored. If the data associated with this block in PSS on the disk had already reached the cache as part of process FT of step s630 then it was also copied to PTT if necessary in step s655, as required by ICP. If the data associated with this block in PSS on the disk had not yet reached the cache as part of process FT of step s630, then, upon arrival of the data from disk, it would not be associated anymore to PSS (step s640), and it would also be copied to PTT if necessary in step s655, as required by ICP. But, since ICF 418 is set to 0, no destage process is applied to PSS, and therefore the new data written to $B_N$ in PSS would not be written to disk until the background process of ICP is completed, so that the data of PSS that may reach PTT is only the data that was there at the time of establishing ICP. Thus, completing WR would not affect the result of ICP to PTT for this block in any case. However, it is also important to note that by doing so, WR is serviced without any delay due to the ICP and in this way a main aim of the invention is satisfactorily achieved.

2. Request to Read from PSS: If a read request RR reaches the cache to read block $B_N$ of PSS, while PSS is undergoing an ICP process, and if $B_N$ of PSS is in cache, the request can be easily completed in its usual way. If $B_N$ is not in cache, it would eventually arrive since a fetch process FT was already triggered for this in step s630. Thus, it is only necessary to place RR in a tasks queue for read tasks, in exactly the way that any other read-miss request is placed as part of the normal handling of read requests in the cache.

3. Request to Write to PTT: If a write request WR reaches the cache to write new data associated with block $B_N$ of PTT, while PSS is undergoing an ICP process, the request is serviced normally, and the new data is eventually associated with PTT by writing to field 416-N of PDTT the space address where the data corresponding to WR is stored. If the data associated with this block in PSS on the disk had already reached the cache as part of process FT of step s630 and was also associated to PTT in step s655, then it would simply be overwritten, as required by WR. If the data associated with this block in PSS on the disk had not yet reached the cache as part of process FT of step s630, then, upon arrival of the data from disk, it would not be associated anymore with PSS (step s650), and the data that arrives from WR (which happened after the time when ICP was issued) will not be overwritten. Thus, completing WR would not affect the result of ICP to PTT for this block in any case. However, it is also important to note that by doing so, WR is serviced in this case without any delay due to the ICP and in this way a main aim of the invention is satisfactorily achieved.

4. Request to Read from PTT: If a read request RR reaches the cache to read block $B_N$ of PSS, while PSS is undergoing an ICP process, and if some data is associated with $B_N$ of PTT in cache, the data is either (1) data that was copied from PSS as part of the ICP or (2) data that was written to PTT after the time when ICP was issued, and that, therefore, should correctly have overwritten the data copied from PSS. Thus, it is coherent to service RR using this data, which can be done with no further delay as any other read request is serviced in the system 10 in case of cache hit. If no data is associated with $B_N$ of PTT in cache, then this is a read-miss and would be serviced like any other read-miss in the system 10. However, one important difference is in place here: a basic principle in any implementation of ways of handling a read-miss in the system 10 comprises triggering some fetch task, to bring the desired data from disk, and then placing the request in some tasks queue until the data reaches the cache from disk, and the read request can be serviced and completed. In the present case, the request is placed in the task-queue, as usual, but no fetch task is initiated, because a fetch task was already triggered for this data by task FT of step s630. In this case, the data that PTT is waiting for is the one associated with PSS at the time when ICP was issued and it would eventually arrive and be associated with PTT in steps s650-s655 of algorithm 600. So far the invention has been described in a relatively simple situation, namely, (1) an ICP command is issued to copy PSS to PTT, (2) an atomic ICP command is processed between PSS and PTT (steps s610-s630 in algorithm 600), (3) a background process is launched and it is performed for each block of PSS until it is completed (steps s635-s660 in algorithm 600). In fact, the invention is able to handle even more complex situations that arise whenever a new ICP command arrives directed at either PSS or PTT, while the background process of steps s635-s660 is underway. The four possible cases are now discussed together with the ways in which the invention handles them.

Case I—Source is used again as source: PSS is copied to PTT and while the background process is underway a new ICP command arrives in cache to copy PSS to PTT1. The corresponding cache module 11 may create a descriptor PDTT1 for PTT1. This situation is handled by means of two processes, one atomic and one at the background, similar to the two corresponding parts in algorithm 600, but with slight modifications. The essential element is to establish a chain relationship PSS→PTT→PTT1 that allows handling the old and the new copy process smoothly. This may be done as follows:

A—Atomic Part:

Step s610-I: (1) Use the Source ID fields 419 of PDTT and PDTT1 to indicate that PTT and PTT1 have sources PSS and PTT, respectively, and use the Target ID fields 420 of PDSS and PDTT to indicate that PSS and PTT have targets PTT and PTT1, respectively; (2) ICF 418 is set to 0 in both PDSS and PDTT—also set ICF 418 in PDTT1 to 0.

Step s615-I: Disassociate PTT1 from each data block currently associated with it in cache.

Step s620-I: Check for each of the blocks $B_N$ of PSS if the data associated with the block is currently cached.

Step s625-I: "Instant copy" to PTT1 each block of PSS that is currently in cache.

Step s630-I: This step is skipped. There is no need for copying to PTT1 the data currently stored in cache for PTT, but there is one for copying from PSS (since PTT is now an instant copy of PSS). This data is, however, either already copied in cache or will be copied once the block arrives in cache as part of process FT of step s630 when the copy between PSS and PTT is established.

B—Background Part:

Steps s635-I to s655-I: No change. Blocks of PSS continue to arrive in cache as part of the original fetch request, and they are associated with PSS in cache only if no data is currently associated with PSS in cache.

Step s655-I: No change for the blocks of PTT in cache, but the same process is then repeated for the blocks of PTT1 in cache.

Step s660-I: ICF is set to 1 not only for PDSS and PDTT, but also for PDTT1. None of these three partitions are now undergoing an ICP process anymore. A destage task is created for each of the three partitions.

Case II—Target is used as source: PSS is copied to PTT and while the background process is underway a new ICP command arrives in cache to copy PTT to PTT1. The corresponding cache module 11 may create a descriptor PDTT1 for PTT1. The essential element is to establish a chain relationship PSS→PTT→PTT1 that allows handling the old and the new copy process smoothly. But the data that is to be copied to PTT1 at the time of establishing the triple ICP situation would come, this time, from PTT, rather than from PSS as in Case I.

Therefore, Case II is handled in a way that is almost identical to Case I, expect for the following two steps:

Step s620-II: Check for each of the blocks $B_N$ of PTT if the data associated with the block is currently cached.

Step s625-II: "Instant copy" to PTT1 each block of PTT that is currently in cache.

Case III—Source turns into target: PSS is copied to PTT and while the background process is underway a new ICP command arrives in cache to copy PSS1 to PSS. The corresponding cache module 11 may create a descriptor PDSS1 for PSS1. This situation is handled by means of two processes, one atomic and one at the background, similar to the two corresponding parts in algorithm 600, but with some modifications, which in this case are somewhat more complex that in cases I, II. The essential problem here is that while PSS is now modified to turn into a copy of PSS1, the data stored on the disk for PSS still needs to continue copying to PTT. Thus, algorithm 600 may be modified as follows:

A—Atomic Part:

Step s610-III: (1) Use the Source ID fields 419 of PDSS and PDTT to indicate that PSS and PTT have sources PSS1 and PSS, respectively, and use the Target ID fields 420 of PDSS1 and PDSS to indicate that PSS1 and PSS have targets PSS and PTT, respectively; (2) ICF 418 is set to 0 in both PDSS and PDTT—also set ICF 418 in PDSS1 to 0.

Step s615-III: Disassociate PSS from each data block currently associated with it in cache.

Step s620-III: Check for each of the blocks $B_N$ of PSS1 if the data associated with the block is currently cached.

Step s625-III: "Instant copy" to PSS each block of PSS1 currently in cache.

Step s630-III: Trigger a task that will fetch from disk into cache successively each block of partition PSS1, so that data that is not yet "instantly copied" from PSS1 to PSS in step s625-III, because it is not in cache, may now be copied, and thus eventually completing the ICP.

B—Background Part:

Steps s635-III to s655-III: Here is where the more complex modification takes place. There are two fetch processes underway, FT1 of step s630 when the ICP arrives to copy PSS to PTT, and a second one FT2 triggered in step s630-III when the ICP arrives to copy PSS1 to PSS. Blocks of PSS1 that reach the cache from disk in response to FT2 are handled in steps s635 to s655 as usual, and thus copied from PSS1 to PSS (and not to PTT). However, blocks of PSS that reach the cache from disk in response to FT1 skip steps s635-s640, since they are not to become associated with PSS anymore (since PSS now is a copy of PSS1) and only to become associated with PTT as part of the initial ICP command to copy PSS to PTT.

Step s660-III: When all blocks of PSS on the disk have reached the cache in response to FT1, the ICF 418 is set to 1 only for PDTT, and a destage task is created for PTT. When all blocks of PSS on the disk have reached the cache in response to FT2, the ICF 418 is set to 1 for both PDSS1 and PDSS, and destage tasks are created for both PSS1 and PSS.

Case IV—Target turns into target: PSS is copied to PTT and while the background process is underway a new ICP command arrives in cache to copy PSS1 to PTT. This case cannot be straightforwardly handled as the previous three ones. The reason is simple, namely, that PTT cannot be simultaneously modified from two different sources. What is necessary, then, is to reply to the new ICP request with a "busy" message. Eventually the new ICP will be attempted once again, and it may be adequately performed only when the entire background process of ICP PSS to PTT has been completed.

"Copy on Write" with Only Two Steps in an Atomic Command

"Copy on write" processes, including those associated with the ICP described above, may be implemented with improved efficiency in accordance with the following exemplary embodiments of the invention.

Figure 7:
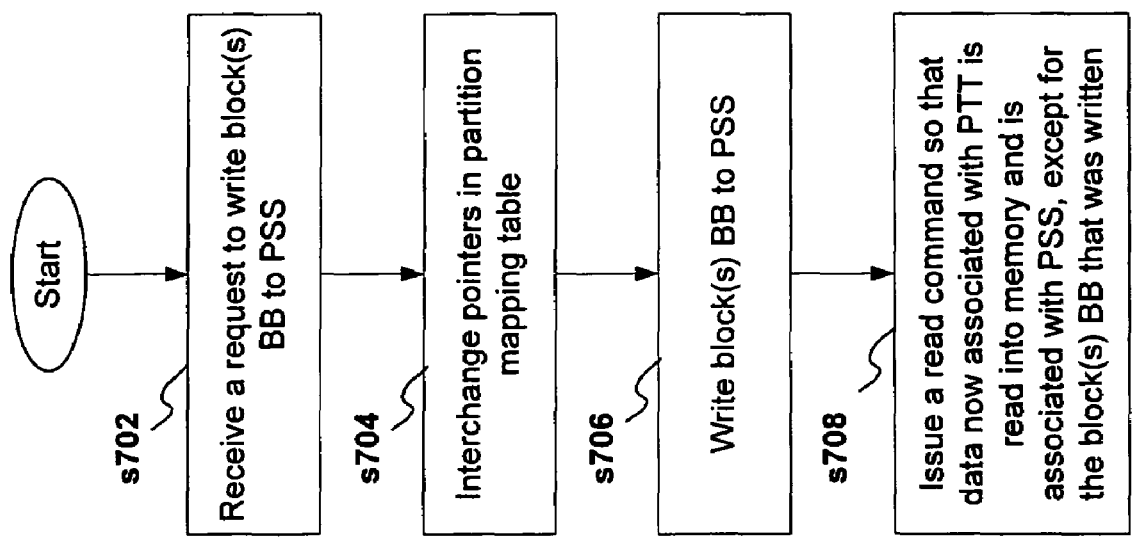
FIG. 7 illustrates a "copy on write" process having a reduced number of steps in accordance with an embodiment of the present invention.

FIG. 7 illustrates an algorithm 700 wherein a "copy on write" process may have a reduced number of steps in accordance with an embodiment of the invention. In step s702, a request to write one or more block(s) BB is received by the controller, e.g., disk control module 386. When such a request arrives on the controller, the "copy on write" command may be performed in this invention as an atomic command comprising the following steps:

s704—Interchange, in partition mapping table 387, pointers such that data associated with PSS is now associated with PTT. Since this command is performed within the controller and involves no IO activity vis-à-vis the corresponding disk(s) 40, it takes virtually zero time to complete.

s706—Based on the interchanged pointers in the partition mapping table 387, writing one or more block(s) BB to PSS.

s708—Based on the interchanged pointers in the partition mapping table 387, issuing a read command to the corresponding disk(s) 40, so that the data now associated with PTT (i.e., the data that was associated with PSS before the interchange of pointers in step s704) is read into the memory of the controller. The read data is associated with PSS, except for the block(s) BB that was written and meanwhile modified in step s706.

It should be noted that by changing pointers and by reading now disk data of PTT for PSS, PSS is restored to its original data except for the block modified by the write command. It should also be noted that steps s706 and s708 can be performed simultaneously by the system: the write process in step s706 need not wait for the read step s708 to complete. The entire "copy on write" process is completed, at most, in the time taken to complete one IO request to the corresponding disk(s) 40. Instead of the usual process typically involving: (1) read from disk to controller, (2) write from partition to partition, and (3) write from host to partition, the present invention reduces the steps to: at step s704, change pointers (no IO operation); and then, simultaneously, at step s706, write and, at step s708, read.

In fact, if the entire track needs to be rewritten, then it can simply be written on a new position and in this way the entire command may be reduced to one operation. If the write is partial, then the entire track needs to be read and changed according to the data to be written. The write may then be completed, and the total number of operations would be two.

In a preferred embodiment, step s706 may be performed immediately after s704. Cache Management Module 382 may, however, be configured to keep block(s) BB in memory and write it to PSS only later on, according to current performance parameters in the cache or any other criteria.

Likewise, in a preferred embodiment, step s708 may be performed following after s704 (and independent of whether or not s706 has already been performed). Since step s708 may involve one disk IO, which involves a certain amount of time to complete, the Cache Management Module 382 and/or Disk Control Module 386 may be configured to define a task necessary to read into cache data now associated with PTT and to maintain one or more read task queues to which this task is added. The queue(s) may be maintained according to any approach, such as FIFO, LIFO, LRU, etc. (or see U.S. patent application Ser. No. 11/165,976 filed on Jun. 24, 2005) and the read task may be performed when its turn arrives. The data thus read may thereafter be associated with PSS, except for the block(s) BB.

FIG. 8 illustrates an algorithm 800 wherein a "copy on write" process may have a reduced number of steps according to another embodiment of the invention. In step s802, a request to write block(s) BB is received by the controller, for example, disk control module 386. When such a request arrives on the controller, the "copy on write" command is performed in this invention as an atomic command comprising the following steps:

s804—Interchange, in partition mapping table 387, pointers such that data associated with PSS is now associated with PTT. In this way, the data that was associated with PSS is now associated with PTT, which is the aim of the "copy on write" process. As this command is performed within the controller and involves no IO activity vis-à-vis the corresponding disk(s) 40, it takes virtually zero time to complete.

s806 and s808—Based on the interchanged pointers in the partition mapping table 387, simultaneously writing BB to PSS and issuing a read command so that data now associated to PTT is read into memory and associated with PSS, except for the block(s) BB that was written. Based on the simultaneously issued read command, the data now associated with PTT (i.e., the data that was associated with PSS before the interchange of pointers in step s804) is read into the memory of the controller and is associated now to PSS, except for the block(s) BB that was written.

FIG. 9 illustrates an algorithm 900 wherein a "copy on write" process may have a reduced number of steps according to yet another embodiment of the invention. The partition descriptors may indicate, in addition to what has been described so far, a source-target relation while the process described here is underway. Thus, a process according to the present invention may be as follows:

s902—Receive a request to write block(s) BB to PSS s904—Interchange, in partition mapping table 387, pointers such that data associated with PSS is now associated with PTT. In this way, the data that was associated with PSS is now associated with PTT, which is the aim of the "copy on write" process. As this command is performed on the controller memory (e.g., in cache module 11) and involves no IO activity vis-à-vis the corresponding disk(s) 40, it takes virtually zero time to complete.

s906—Based on the interchanged pointers in the partition mapping table 387, writing one or more block(s) BB to PSS.

s908—Indicate on the descriptor PDSS that all other data blocks in this partition are invalid. Indicate in the descriptor PDSS that PSS has an active target PTT, and in PDTT that PTT has an active source PSS.

It should be noted that if a read request reaches now PSS for block(s) BB, then this request is responded to by using the data now associated with PSS. For all other blocks, the data is brought from PTT (while the blocks on PSS are indicated as invalid). All the while, data associated with PSS and with PTT may have remained in the controller, or may have been written into the corresponding disk(s) 40 and erased from the controller and it will be necessary to read it from the corresponding disk(s) 40. A read request that arrives for PSS may need to be broken into two read tasks: one task will read block(s) BB from the memory or from the corresponding disk(s) 40 as associated with PSS (this is the part which is now valid), and a second task will read the other blocks either from memory or from disk in association with PTT (the part which is invalid in PSS and can be read from PTT after steps s902 and s904).

Thus, the present invention provides for a simpler and more efficient scheme for the following reasons:

(a) the write command directed at PSS is handled without any additional latency due to the source-target situation that involves the two partitions, PSS and PTT, as is typically the case in a "copy on write" situation. In addition, by avoiding the "copy" part of the operation, the individual "copy on write" step is achieved with less IO activity. This is a principal objective of the invention.

(b) the read command is the one that seems to involve additional steps and complexity in some cases. Nevertheless, this happens only occasionally. If the storage system is working under normal-to-high load, the typical situation will involve writing entire partitions rather than isolated blocks as in the example above. In such cases, the read tasks will not have to be divided into two since no blocks in the partition will be indicated as "invalid." Only if a storage system is working in a truly random fashion (blocks randomly written and read) may blocks of the same partitions end up being stored in two separate physical places. Statistically, this situation would not arise very frequently, and the corresponding delay that may arise is more than compensated by the advantages of the invention.

(c) in an alternative embodiment of the invention, one may force the valid part of PSS to remain in the memory while triggering a background process that will eventually bring the data now associated with partition PTT into the controller and add this data to the modified PSS. Later on, the entire PSS, all of whose blocks are now valid, may also eventually be destaged to the disk. In this way, the situation of two read tasks is eventually avoided for most partitions that have undergone the process, since, after a period of time, PSS turns into a standard partition that is read or written to in the standard way.

It should be noted that the above-described instant copy process ("ICP") may be orthogonal to the "copy on write" processes illustrated in FIGS. 7-9. The ICP process avoids latency on the write command to the partition, whereas the processes of FIGS. 7-9 spare one operation. It should be noted that these processes can be used simultaneously or separately in the system in which they are implemented.

It will be evident to those well-versed in the art that the processes just described can be applied iteratively one after the other without any further modification, and thus the invention embodies the possibility of unlimited ICP processes being applied at any moment, in any direction and with virtually no limitation. Furthermore, although the invention has been described, in places, in terms of one block of data BB, one skilled in the art can easily generalize data read and/or data write operations to any number of blocks.

CONCLUSION

A system and method has been shown in the above embodiments for the effective implementation of an instant copy operation in a cache memory. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one skilled in the art of networking.

The invention claimed is:

1. A method to create a copy of data in a cache memory module associated with a storage system by an instant copy process ("ICP"), said method comprising the steps of:

maintaining, in said cache memory module, a first descriptor associated with a first partition and a second descriptor associated with a second partition, said first partition associated with a source logical unit ("$LU_S$") and said second partition associated with a target logical unit ("$LU_T$");

establishing an ICP between said first partition and said second partition by setting an ICP flag in said first descriptor and said second descriptor indicating said first partition and said second partition are undergoing a copy-on-write operation;

dissociating each data block currently associated with said second partition;

copying each block $B_N$ of said first partition in said cache memory module from said first partition to said second partition in said cache memory module by updating a location of each block $B_N$ in said second descriptor;

triggering a fetch task to fetch one or more blocks of said first partition not in said cache memory module from one or more storage units in said storage system;

receiving one or more fetched data blocks from said one or more storage units into said cache memory module;

determining whether there is data in said cache memory module associated with the one or more received data blocks in said first partition, and if so, associating said one or more received data blocks with said first partition in said cache memory module;

determining whether there is data in said cache memory module associated with the one or more received data blocks in said second partition, and if so, associating the one or more received data blocks with said first partition in said cache memory module; and setting said ICP flag to indicate that said first partition and said second partition have completed said ICP.

2. The method of claim 1, further comprising incorporating in said cache memory module a controller for one or more of said one or more storage units.

3. The method of claim 1, wherein the dissociating step includes erasing, in said second descriptor, locations of blocks of said second partition currently stored in said cache memory module.

4. The method of claim 1, wherein, prior to the disassociating step, blocks of said second partition currently stored in memory are restored to a memory reservoir.

5. The method of claim 1, further comprising configuring said storage system as a storage area network ("SAN").

6. The method of claim 1, further comprising configuring said storage system as a network attached storage ("NAS") system.

* * * * *